United States Patent
Biery et al.

(10) Patent No.: US 9,267,628 B2
(45) Date of Patent: Feb. 23, 2016

(54) METHOD OF MAKING A TAMPER RESISTANT COUPLING

(71) Applicant: Victaulic Company, Easton, PA (US)

(72) Inventors: Wayne M. Biery, Center Valley, PA (US); Ahmad Sith, Bethlehem, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 436 days.

(21) Appl. No.: 13/888,439

(22) Filed: May 7, 2013

(65) Prior Publication Data

US 2014/0333062 A1    Nov. 13, 2014

(51) Int. Cl.

| | |
|---|---|
| *F16L 23/00* | (2006.01) |
| *F16L 23/08* | (2006.01) |
| *F16B 41/00* | (2006.01) |
| *B29K 63/00* | (2006.01) |
| *B29K 75/00* | (2006.01) |
| *B29K 105/00* | (2006.01) |
| *B29L 23/00* | (2006.01) |

(52) U.S. Cl.
CPC .............. *F16L 23/003* (2013.01); *F16B 41/005* (2013.01); *F16L 23/08* (2013.01); *B29K 2063/00* (2013.01); *B29K 2075/00* (2013.01); *B29K 2105/0097* (2013.01); *B29L 2023/22* (2013.01); *Y10T 29/49888* (2015.01); *Y10T 29/49948* (2015.01); *Y10T 29/49963* (2015.01); *Y10T 29/49966* (2015.01); *Y10T 29/49982* (2015.01)

(58) Field of Classification Search
CPC ...... F16L 23/003; F16L 23/08; F16B 41/005; B29L 2023/22; B29K 2063/00; B29K 2075/00; B29K 2105/0097; Y10T 29/49888; Y10T 29/4998; Y10T 29/49982; Y10T 29/49963; Y10T 29/49966; Y10T 29/49948
See application file for complete search history.

(56) References Cited

U.S. PATENT DOCUMENTS

| 3,298,272 | A | * | 1/1967 | Henderson | F16B 37/14 411/373 |
|---|---|---|---|---|---|
| 3,443,792 | A | * | 5/1969 | Moss | F01D 5/187 416/241 B |
| 4,852,403 | A | * | 8/1989 | Bednarz | G01F 15/007 285/80 |
| 5,749,670 | A | * | 5/1998 | Astor | F16B 37/14 29/525.14 |
| 8,047,478 | B1 | * | 11/2011 | Krauss | A63B 9/00 211/182 |
| 2014/0053798 | A1 | * | 2/2014 | Krause | F16B 39/225 123/197.3 |

* cited by examiner

*Primary Examiner* — Sarang Afzali
(74) *Attorney, Agent, or Firm* — Ballard Spahr LLP

(57) ABSTRACT

A tamper resistant pipe coupling is formed of segments connected end to end using fasteners. The segments have bearing pads at each end, each bearing pad surrounded by a shield wall. The shield walls and the bearing pads form a well that receives the fasteners and provides defense against tampering. The well is filled with a potting material, such as refractory cement, to cover the fasteners and provide additional protection. Formations are provided on the bearing pad and shield wall to ensure positive mechanical engagement between the coupling and the potting layer. The shield wall and bearing pad may be integrally formed with the coupling segments or a separate component.

6 Claims, 7 Drawing Sheets

METHOD OF MAKING A TAMPER RESISTANT COUPLING

FIELD OF THE INVENTION

This invention relates to features and methods for increasing the tamper resistance of couplings joining pipe elements in end to end relation.

BACKGROUND

Pipe lines carrying water, oil, or mineral slurries which run on the earth's surface through remote areas where there is scant protection available can easily be the target of vandalism. Under such conditions flanged pipe lines may be vandalized merely for the scrap or resale value of the bolts and nuts which join the flanges. Pipe lines having mechanical couplings joining the pipe elements are also potentially vulnerable to such predation due to the exposed threaded fasteners used to assemble the mechanical couplings. For large diameter pipe lines the fasteners alone can provide what is regarded as significant scrap or resale value under such circumstances.

Removal of the fasteners holding the segments of a pipe line together can cause economic disruption until the pipe line is repaired and made operational. There is clearly a need for mechanical couplings which are resistant to tampering to help avoid or mitigate this potential problem.

SUMMARY

The invention concerns a coupling for joining pipe elements end to end. In one example embodiment, the coupling comprises a plurality of segments attached to one another end to end surrounding a central space for receiving the pipe elements. An attachment fitting is located at each end of each one of the segments. Each one of the attachment fittings comprises a bearing pad projecting outwardly from the end of the segment. The bearing pad has an opening therethrough. A shield wall surrounds at least a portion of the bearing pad and forms a well. The bearing pad is positioned at a bottom of the well. A fastener is positioned within the well and extends through the openings of the bearing pads to secure the segments to one another.

The example coupling embodiment may further comprise a layer of potting material positioned within at least one of the wells. The potting material may cover the fastener. In an example embodiment, the potting material may comprise a polymer such as epoxy, polyurethane or glue. In another example, the potting material may comprise cement. In one example embodiment, the potting material comprises a refractory material, such as refractory cement.

The example embodiment may further comprise a recess in a surface of at least one of the shield walls of at least one of the wells. The recess is positioned within the at least one well. When a layer of potting material is positioned within the at least one well, the potting material at least partially fills the recess.

In another example embodiment, the coupling may further comprise a plurality of recesses in a surface of at least one of the shield walls of at least one of the wells. The recesses are positioned within the at least one well. A layer of potting material may be positioned within the at least one well, the potting material at least partially filling the recess.

In another example embodiment, the coupling may further comprise a projection extending from a surface of at least one of the shield walls of at least one of the wells. The projection extends into the at least one well. The example embodiment may further comprise a layer of potting material positioned within the at least one well, the potting material at least partially surrounding the projection.

By way of example, the coupling may further comprise a plurality of projections extending from a surface of at least one of the shield walls of at least one of the wells. The projections extend into the at least one well. The example embodiment may further comprise a layer of potting material positioned within the at least one well. The potting material at least partially surrounds the projections.

In another example embodiment, the coupling further comprises an aperture in at least one of the shield walls of at least one of the wells. A layer of potting material may be positioned within the at least one well, the potting material at least partially filling the aperture. Additionally, an example coupling may further comprise a plurality of apertures in at least one of the shield walls of at least one of the wells. When a layer of potting material is positioned within the at least one well, the potting material at least partially fills the apertures.

In another example embodiment, the coupling may further comprise an aperture in the bearing pad. A layer of potting material may be positioned within the well, the potting material at least partially filling the aperture. In a particular example embodiment, the aperture has a conical shape. In another example embodiment, the coupling further comprises a plurality of apertures in the bearing pad. A layer of potting material may be positioned within the well, the potting material at least partially filling the apertures. In a particular example embodiment, at least one of the apertures has a conical shape.

The invention also encompasses a cup for use with a coupling for joining pipe elements end to end. In an example embodiment, the coupling comprises a plurality of segments attached to one another end to end surrounding a central space for receiving the pipe elements. Each one of the segments has bolt pads located at each end thereof. Each one of the bolt pads projects outwardly from each end of the segments. Each one of the bolt pads has an opening receiving a fastener securing the segments to one another end to end. In this example embodiment, the cup comprises a bearing pad having an opening therethrough. The bearing pad is positionable in overlying relation with the bolt pad so as to align the opening in the bearing pad with the opening in the bolt pad for receiving the fastener. A shield wall surrounds at least a portion of the bearing pad and forms a well, the bearing pad being positioned at a bottom of the well.

In another example embodiment, the cup further comprises a recess in a surface of the shield wall, the recess being positioned within the well. In another example embodiment, the coupling further comprises a plurality of recesses in a surface of the shield wall, the recesses being positioned within the well.

In another example embodiment, the cup further comprises a projection extending from a surface of the shield wall, the projection extending into the well. By way of example, the cup may further comprise a plurality of projections extending from a surface of the shield wall, the projections extending into the well.

In another example embodiment, the cup further comprises an aperture in the shield wall. By way of example, the cup further comprises a plurality of apertures in the shield wall. In another example embodiment, the cup comprises an aperture in the bearing pad. In a particular example embodiment, the aperture has a conical shape. In another example embodiment, the cup further comprises a plurality of apertures in the bearing pad. In a particular example embodiment, at least one of the apertures has a conical shape.

The invention also encompasses, in combination, a coupling for joining pipe elements end to end and at least one cup for use with the coupling. In an example embodiment, the coupling comprises a plurality of segments attached to one another end to end surrounding a central space for receiving the pipe elements. A bolt pad is located at each end of each one of the segments. Each one of the bolt pads projects outwardly from each end of the segments. Each one of the bolt pads has an opening receiving a fastener securing the segments to one another end to end. In an example embodiment, the at least one cup comprises a bearing pad having an opening therethrough. The bearing pad is positioned in overlying relation with one of the bolt pads so as to align the opening in the bearing pad with the opening in the one bolt pad. The opening in the bearing pad receives the fastener. A shield wall surrounds at least a portion of the bearing pad and forms a well. The bearing pad is positioned at a bottom of the well.

In one example embodiment, the combination further comprises a layer of potting material positioned within the well. The potting material may cover the fastener. In an example embodiment, the potting material may comprise a polymer such as epoxy, polyurethane or glue. In another example, the potting material may comprise cement. In one example embodiment, the potting material comprises a refractory material, such as refractory cement.

In another example embodiment, the combination further comprises a recess in a surface of the shield wall, the recess being positioned within the well. When a layer of potting material is positioned within the well, the potting material at least partially fills the recess.

In another example embodiment, the combination further comprises a plurality of recesses in a surface of shield wall, the recesses being positioned within the well. In one example embodiment, the combination further comprises a layer of potting material positioned within the well, the potting material at least partially filling the recesses.

In another example embodiment, the combination further comprises a projection extending from a surface of the shield wall, the projection extending into the well. A layer of potting material may be positioned within the well, the potting material at least partially surrounding the projection.

In another example embodiment, the combination further comprises a plurality of projections extending from a surface of the shield wall, the projections extending into the well. In one example embodiment, the combination further comprises a layer of potting material positioned within the well, the potting material at least partially surrounding the projections.

In another example embodiment, the combination further comprises an aperture in the shield wall. In another example embodiment, the combination further comprises a layer of potting material positioned within the well, the potting material at least partially filling the aperture.

In another example embodiment, the combination further comprises a plurality of apertures in the shield wall. In another example embodiment, the combination further comprises a layer of potting material positioned within the well, the potting material at least partially filling the apertures.

In another example embodiment, the combination further comprises an aperture in the bearing pad. In another example embodiment, the combination further comprises a layer of potting material positioned within the well, the potting material at least partially filling the aperture. In a particular example embodiment, the aperture has a conical shape.

In another example embodiment, the combination further comprises a plurality of apertures in the bearing pad. In another example embodiment, the combination further comprises a layer of potting material positioned within the well, the potting material at least partially filling the apertures. At least one of the apertures may have a conical shape.

The invention also encompasses a segment of a coupling for joining pipe elements end to end. In an example embodiment, the segment comprises a pair of arcuate surfaces adapted to engage the pipe elements. A bearing pad projects outwardly from an end of the segment, the bearing pad having an opening therethrough. A shield wall surrounds at least a portion of the bearing pad and forms a well. The bearing pad is positioned at a bottom of the well. A recess may be located in a surface of the shield wall. The recess is positioned within the well. In another example embodiment, a plurality of recesses are located in a surface of the shield wall. Again, the recesses are positioned within the well. Another example embodiment comprises a projection extending from a surface of the shield wall. The projection extends into the well.

An example embodiment may further comprise a plurality of projections extending from a surface of the shield wall. The projections extend into the well. Another example embodiment may further comprise an aperture in the shield wall. A further example embodiment comprises a plurality of apertures in the shield wall. Additional example embodiments may comprise an aperture in the bearing pad. The aperture may have a conical shape. A further example embodiment may comprise a plurality of apertures in the bearing pad. At least one of the apertures may have a conical shape.

The invention also encompasses a method of making a coupling tamper resistant. The example coupling embodiment comprises a plurality of segments attached end to end by at least one fastener. The method comprises at least partially surrounding the fastener with a potting material. One example of the method comprises at least partially surrounding the fastener with a polymeric potting material. The polymer may be selected from the group consisting of epoxy, polyurethane or glue. Another example method comprises at least partially surrounding the fastener with cement. Another example embodiment comprises at least partially surrounding the fastener with a refractory material. In a particular example embodiment, the refractory material comprises refractory cement.

DETAILED DESCRIPTION

Figure 1:
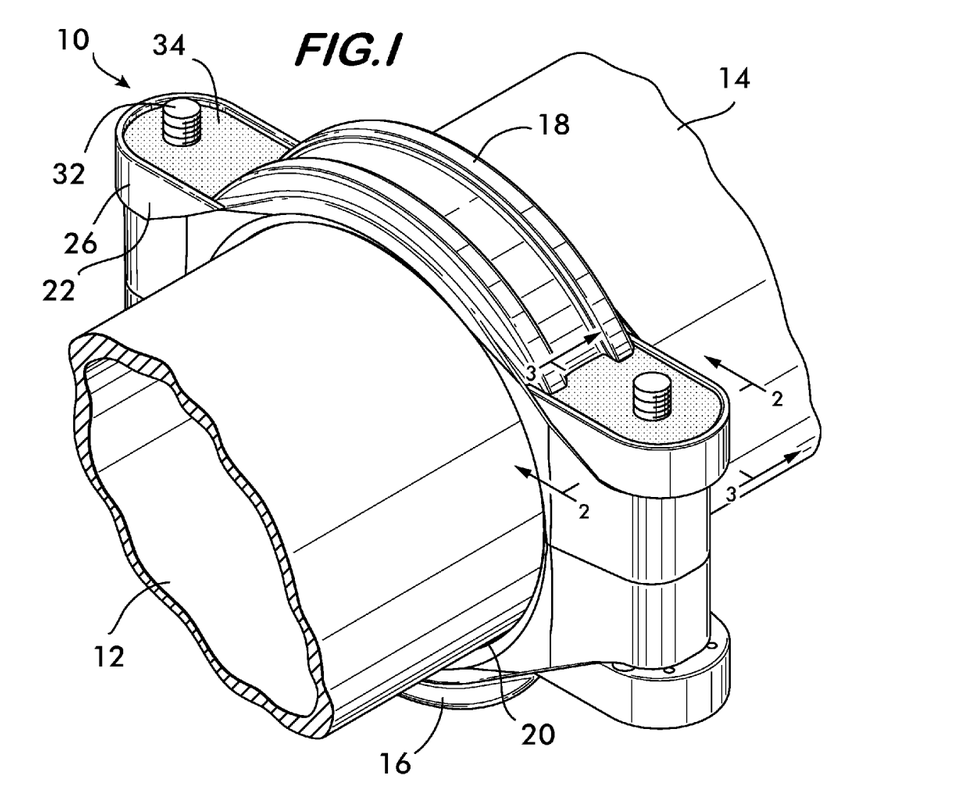
FIG. 1 is an isometric view of an example coupling according to the invention.
Figures 2, 3:
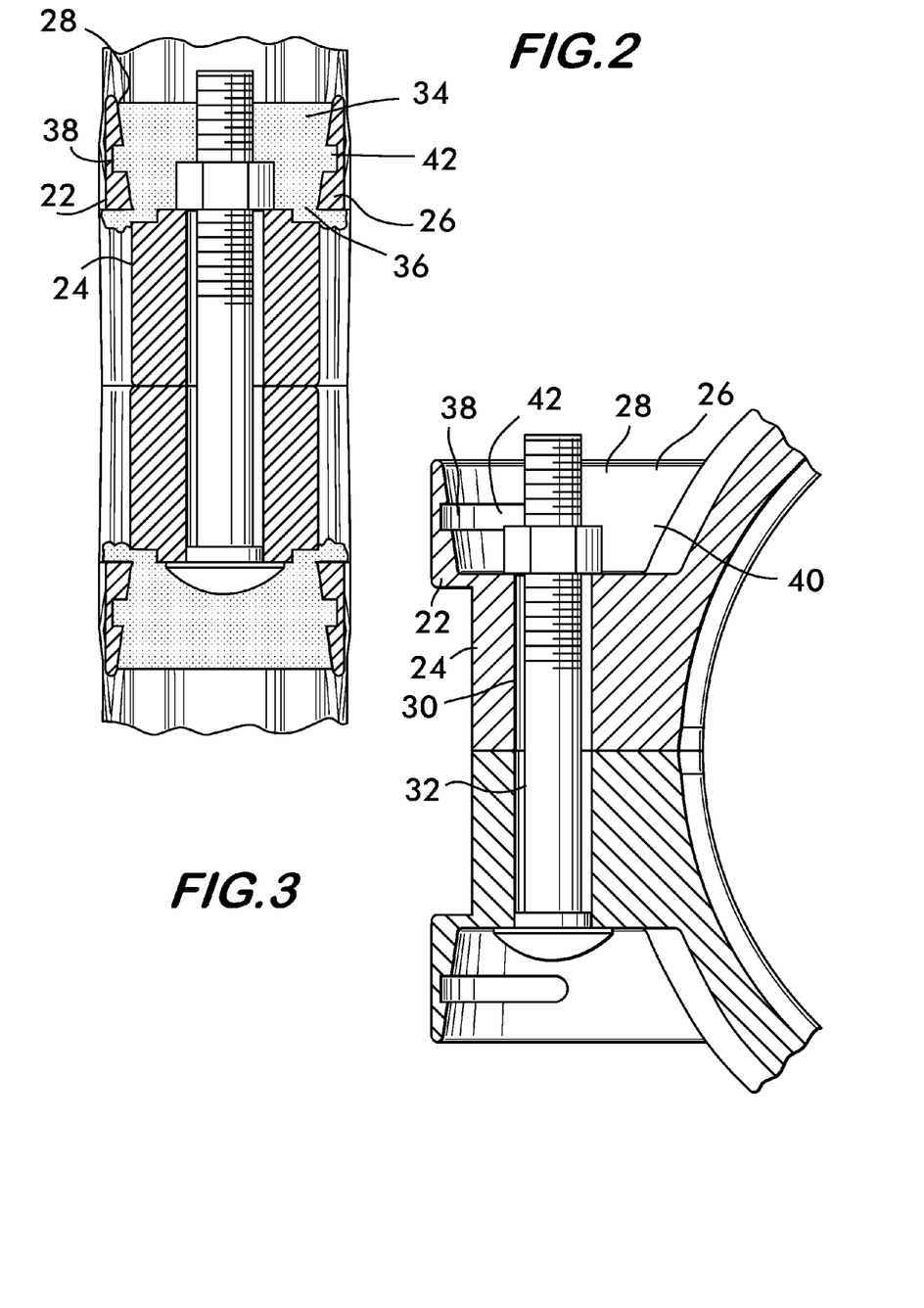
FIG. 2 is a sectional view taken at line 2-2 of FIG. 1.
FIG. 3 is a sectional view taken at line 3-3 of FIG. 1.

FIG. 1 shows an example coupling 10 for joining pipe elements 12 and 14 end to end. Coupling 10 comprises a plurality of segments, in this example, two segments 16 and 18. Segments 16 and 18 are attached to one another end to end and surround a central space 20 which receives the pipe elements 12 and 14. An attachment fitting 22 is located at the ends of each of the segments 16 and 18. As shown in FIG. 3, attachment fittings 22 comprise a bearing pad 24 which projects outwardly from the end of the segment, and a shield wall 26 which surrounds at least a portion of the bearing pad. Shield wall 26 and bearing pad 24 cooperate to form a well 28, the bearing pad 24 forming the bottom of the well. Bearing pads 24 have openings 30 which receive fasteners 32, in this example, threaded fasteners for securing the segments 16 and 18 to one another.

The presence of the shield wall 26 alone hinders the application of a wrench, chisel, or other tool to the fasteners which would allow vandalizing of the coupling or removal of the fasteners for their scrap or resale value. However, as shown in FIGS. 1 and 2, additional protection of the fasteners is obtained through the use of a layer of curable potting material 34 positioned within and at least partially filling wells 28 and covering the fasteners 32 and further protecting and denying access to the fasteners. Potting material 34 may comprise a polymer, such as epoxy, polyurethane or glue, as well as a cementicious material, such as cement. Refractory materials, such as refractory cement for example, are advantageous because they will protect the fasteners from both physical tampering as well as heat, in the form of a blow torch which might be applied to cut and remove the fasteners 32.

Figures 4, 5:
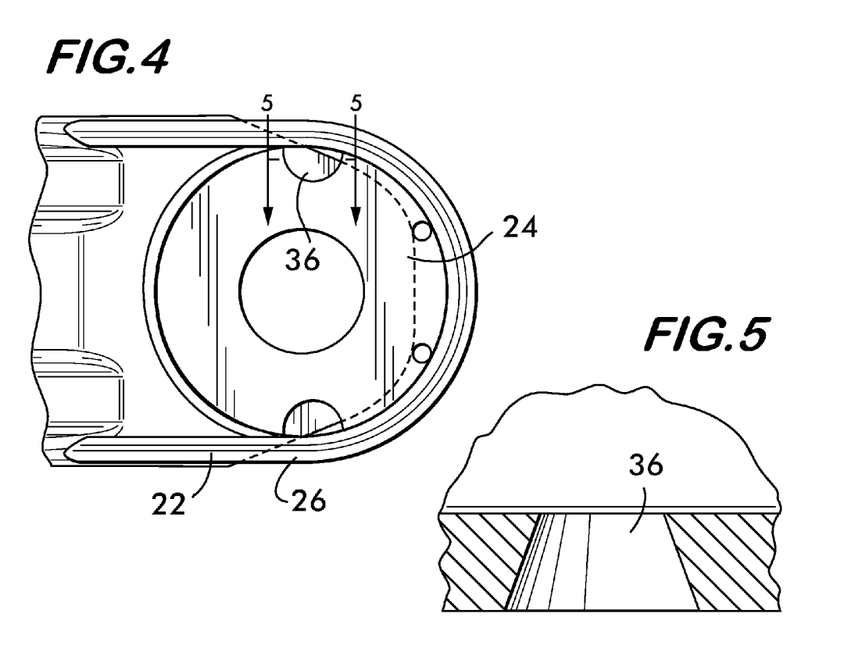
FIG. 4 is a top view of a portion of an example coupling segment according to the invention.
FIG. 5 is a sectional view taken at line 5-5 of FIG. 4.

To help secure the potting layer 34 within the well 28 it is advantageous to employ positive mechanical engagement between it and the shield wall 26 and/or the bearing pad 24. Positive mechanical engagement may be effected in various ways. As shown in FIG. 4, one or more apertures 36 are positioned in the bearing pad 24. As shown in FIG. 2, when the potting layer 34, such as refractory cement, fills the well 28, before it cures, it enters the apertures 36. Upon curing, that portion of the potting material 34 within the apertures 36 provides positive mechanical engagement between the potting material layer 34 and the attachment fitting 22. This mechanical engagement offers further resistance hindering removal of the potting layer 34. The apertures 36 may have a conical shape as shown in FIG. 5 to further improve the engagement. In the absence of the potting layer 34 the apertures 36 act as drain holes to permit water to drain from the well 28.

Figure 6:
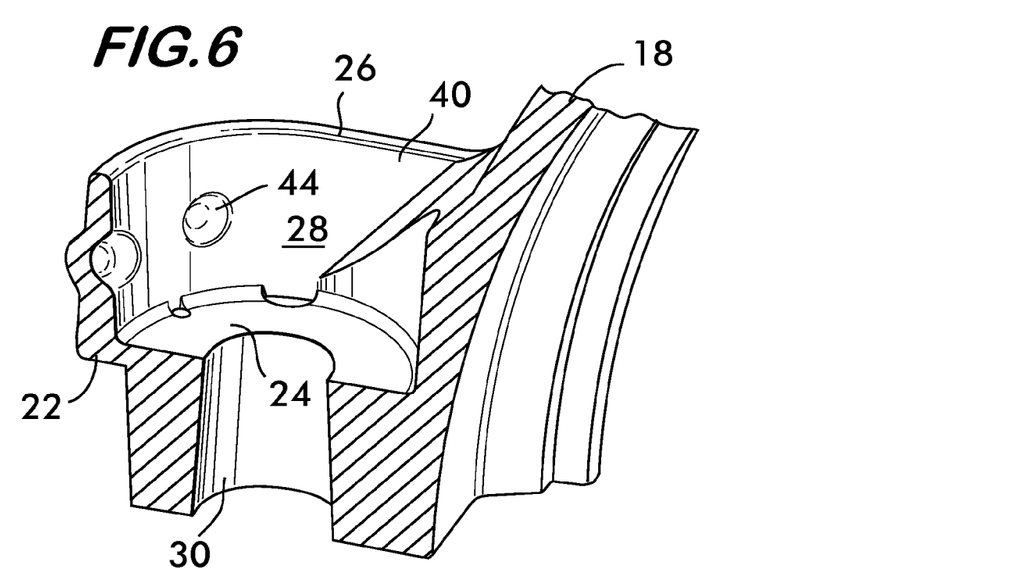
FIG. 6 is an isometric sectional view of a portion of an example coupling segment according to the invention.
Figure 7:
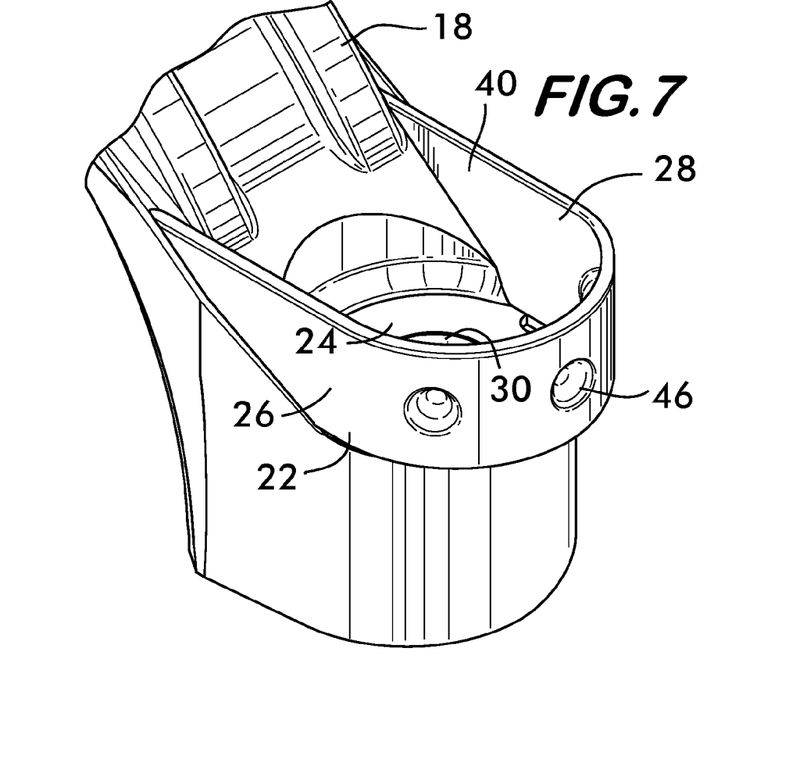
FIG. 7 is an isometric view of a portion of an example coupling segment according to the invention.
Figure 8:
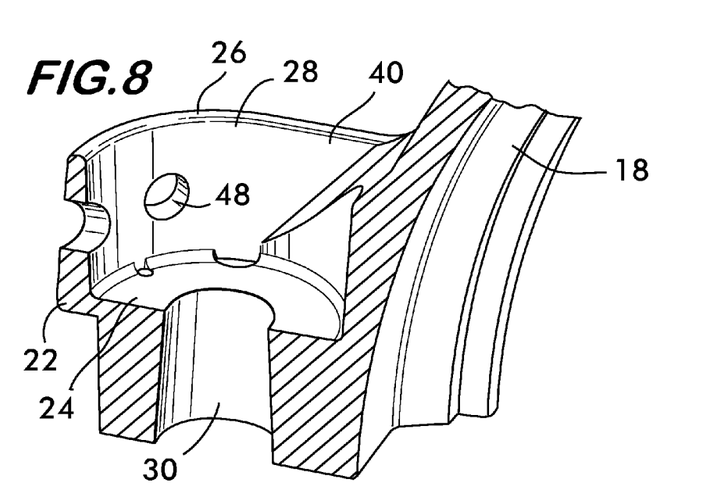
FIG. 8 is an isometric sectional view of a portion of an example coupling segment according to the invention.

Other formations may be located on the attachment fitting 22 to promote positive mechanical engagement between the potting material layer 34 and the attachment fitting. As shown in FIGS. 2 and 3, a recess 38 may be positioned in the surface 40 of the shield wall 26. The term "recess" is used herein in a general sense to indicate any formation in the surface 40 such as dimples, indentations, grooves and the like which will offer a positive mechanical engagement between the potting material layer 34 and the attachment fitting. A groove 42 is shown extending along surface 40 in FIGS. 2 and 3, FIG. 2 showing how the groove 42 fills with the potting material 34 to afford the positive mechanical engagement. FIG. 6 shows a plurality of indentations 44 in surface 40 of the shield wall 26, while FIG. 7 shows a plurality of projections 46 extending from the surface 40 into the well 28. The potting layer 34 will at least partially surround the projections 46 to create the positive mechanical engagement desired. FIG. 8 shows apertures 48 in the shield wall 26. The potting material 34 will enter the apertures 48 and form the desired positive mechanical engagement upon curing.

Figures 9, 10:
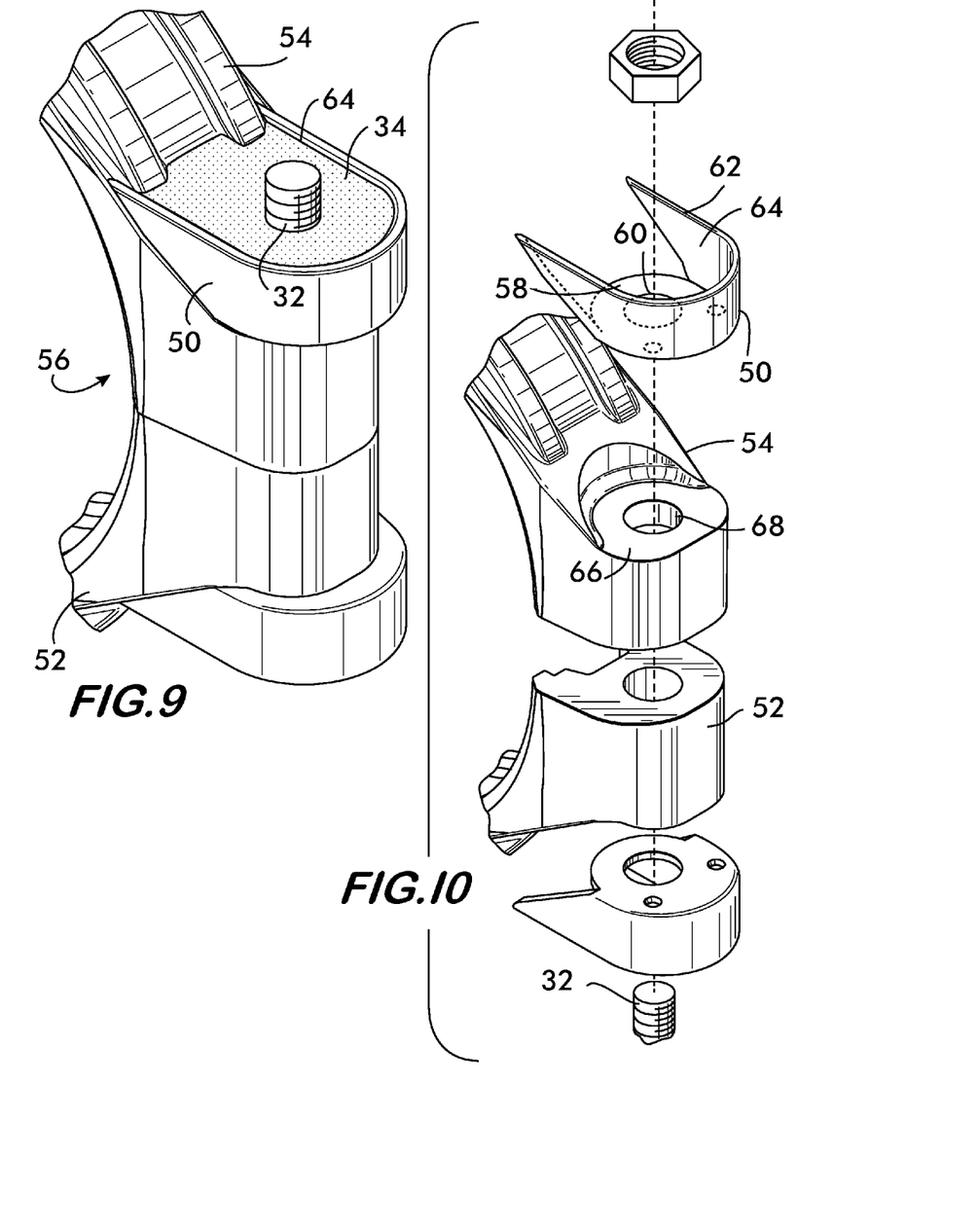
FIG. 9 is an isometric view of a portion of an example coupling according to the invention.
FIG. 10 is an exploded isometric view of the portion of the example coupling shown in FIG. 9.

As shown in FIGS. 9 and 10, the invention also encompasses a cup 50 useable to form a well 28 surrounding fasteners 32 in combination with segments 52 and 54 with which a shield wall is not integrally formed. This allows existing couplings 56 to be retrofitted in the field with features which make them tamper resistant. Cups 50 may also be supplied as an option along with the couplings. As shown in detail in FIG. 10, cup 50 comprises a bearing pad 58 having an opening 60 for receiving the fastener 32. A shield wall 62 surrounds at least a portion of the bearing pad 58 and forms a well 64, the bearing pad 58 forming the bottom of the well.

Figure 11:
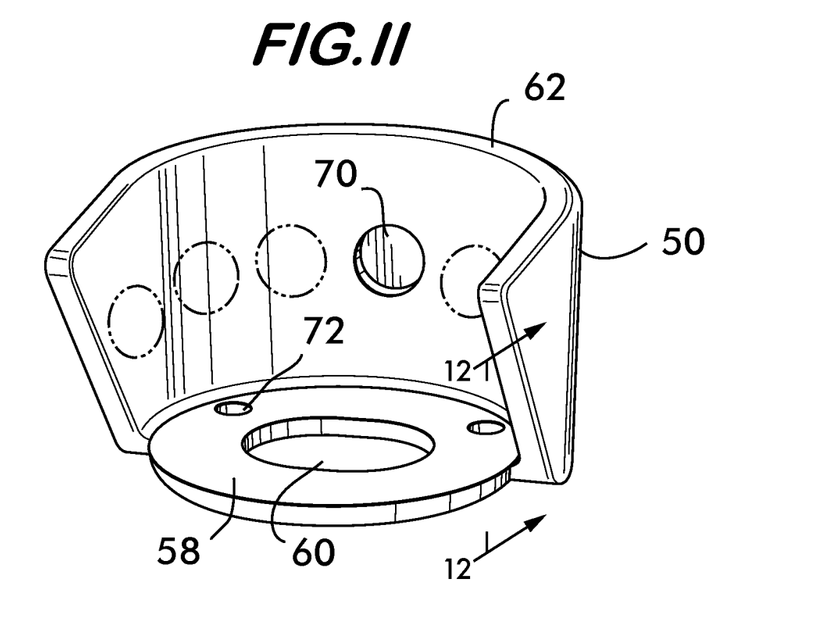
FIG. 11 is an isometric view of an example cup according to the invention.
Figure 12:
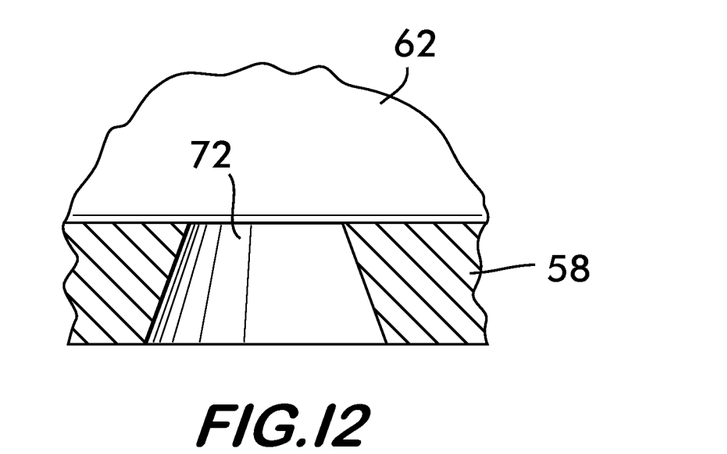
FIG. 12 is a sectional view taken at line 12-12 of FIG. 11.

When used in combination with segments 52 and 54, the cup 50 is positioned with its bearing pad 58 in overlying relation with bolt pads 66 located at each end of the segments 52 and 54. Note that the bolt pads 66 have openings 68 which align with openings 60 in the bearing pad 58 to receive the fasteners 32, the fasteners retaining the cups 50 to the segments 52 and 54. The cup 50 can be used alone to improve the tamper resistance of the coupling 56, or, as illustrated in FIG. 9, a potting material layer 34 can be positioned within the well 64 to cover the fastener and provide additional tamper resistance. As noted above, the potting material 34 may comprise a polymer, such as epoxy, polyurethane or glue, as well as a cementicious material, such as cement, with refractory cements being advantageous. As shown in FIG. 11, one or more apertures 70 and 72 may be located in the shield wall 62 and/or the bearing pad 58. These features provide for positive mechanical engagement between the cup 50 and the potting layer 34. It is advantageous that the apertures 72 in the bearing pad 58 have a conical shape as shown in FIG. 12 to provide additional positive mechanical engagement. In the absence of potting layer 34, apertures such as 70 and 72 may act as drain holes to permit water to drain from the cup 50.

Figure 13:
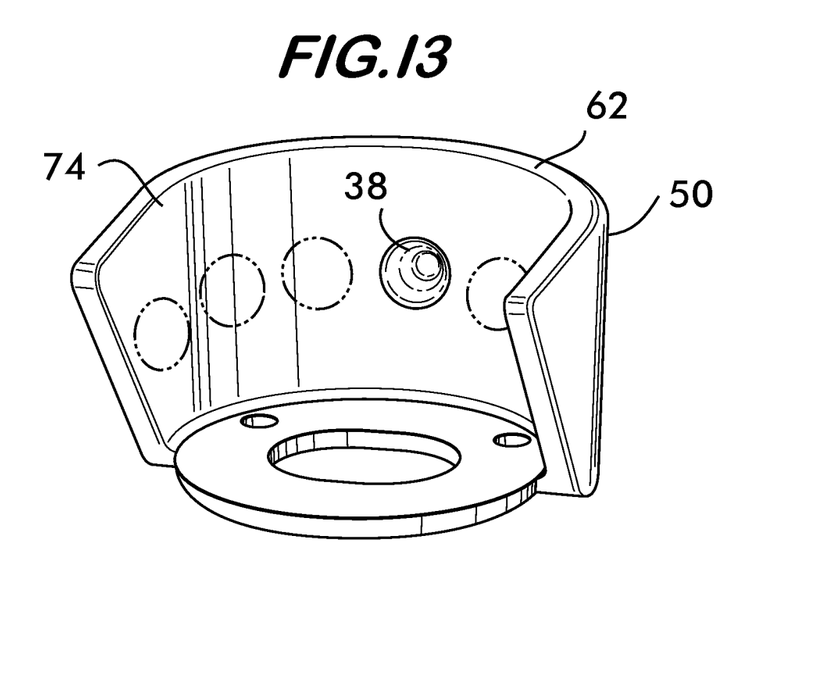
FIGS. 13 and 14 are isometric views of example cups according to the invention.
Figure 14:
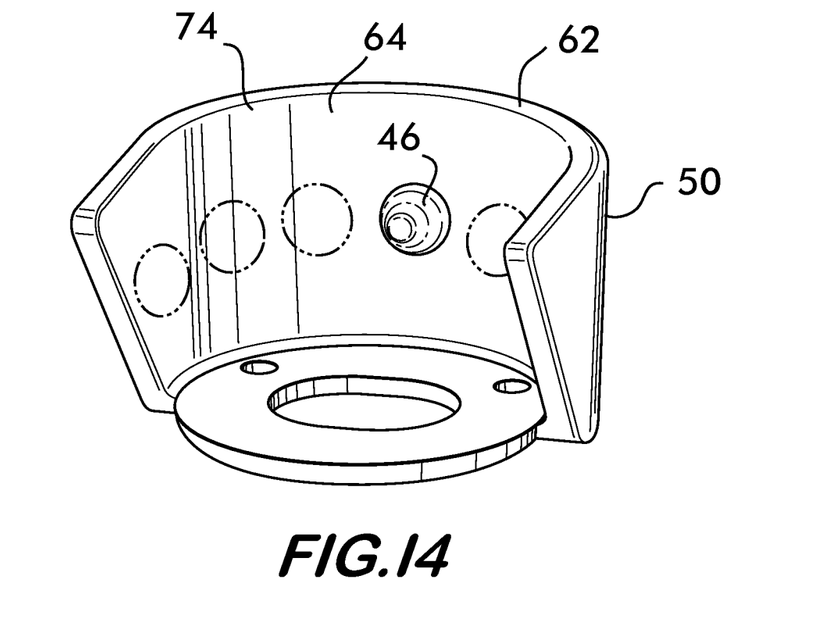

Additional mechanical engagement features may be incorporated into cup 50. As shown in FIG. 13, one or more recesses 38 may be positioned in the surface 74 of the shield wall 62. In another example embodiment, shown in FIG. 14, projections 46 may extend from the shield wall surface 74 into the well 64 to provide the desired mechanical engagement with a potting layer.

The invention also contemplates a method of making a coupling tamper resistant. The method comprises at least partially surrounding the fasteners joining the segments with a potting material, for example, refractory cement.

Couplings having the tamper resistant features as disclosed herein are expected to prove tamper resistant and help avoid the problems associated with vandalizing and pilfering of pipe line fasteners and couplings for scrap metal and other reasons.

What is claimed is:

1. A method of making a coupling for joining pipe elements end to end tamper resistant, said coupling comprising a plurality of segments attached to one another end to end by at least one fastener joining two bolt pads projecting outwardly from ends of two of said segments, each one of said bolt pads having an opening receiving said at least one fastener, said method comprising:

positioning a cup on at least one of said bolt pads, said cup comprising a bearing pad having an opening therethrough, said bearing pad being positioned in overlying relation with said at least one bolt pad so as to align said opening in said bearing pad with said opening in said at least one bolt pad, said openings receiving said at least one fastener, said cup having a shield wall surrounding at least a portion of said bearing pad and forming a well, said bearing pad being positioned at a bottom of said well;

positioning a potting material within said well to at least partially surround said at least one fastener with said potting material.

2. The method according to claim 1, comprising at least partially surrounding said at least one fastener with said potting material, said potting material comprising a polymeric potting material.

3. The method according to claim 2, wherein said polymeric potting material is selected from the group consisting of epoxy, polyurethane and glue.

4. The method according to claim 1, comprising at least partially surrounding said at least one fastener with said potting material, said potting material comprising a refractory material.

5. The method according to claim 4, wherein said refractory material comprises refractory cement.

6. The method according to claim 1, comprising at least partially surrounding said at least one fastener with cement.

* * * * *